Aug. 31, 1937.  W. OWEN  2,091,331
PROCESS AND APPARATUS FOR MAKING SAFETY GLASS
Filed Jan. 8, 1936   2 Sheets-Sheet 1

INVENTOR.
WILLIAM OWEN
BY Bradley + Bee
ATTORNEYS.

Aug. 31, 1937.  W. OWEN  2,091,331
PROCESS AND APPARATUS FOR MAKING SAFETY GLASS
Filed Jan. 8, 1936  2 Sheets-Sheet 2

INVENTOR.
WILLIAM OWEN
BY Bradley & Bee
ATTORNEYS.

Patented Aug. 31, 1937

2,091,331

UNITED STATES PATENT OFFICE 2,091,331

PROCESS AND APPARATUS FOR MAKING SAFETY GLASS

William Owen, Pittsburgh, Pa., assignor to Pittsburgh Plate Glass Company, a corporation of Pennsylvania Application January 8, 1936, Serial No. 58,127

5 Claims. (Cl. 49—81)

Figure 1:
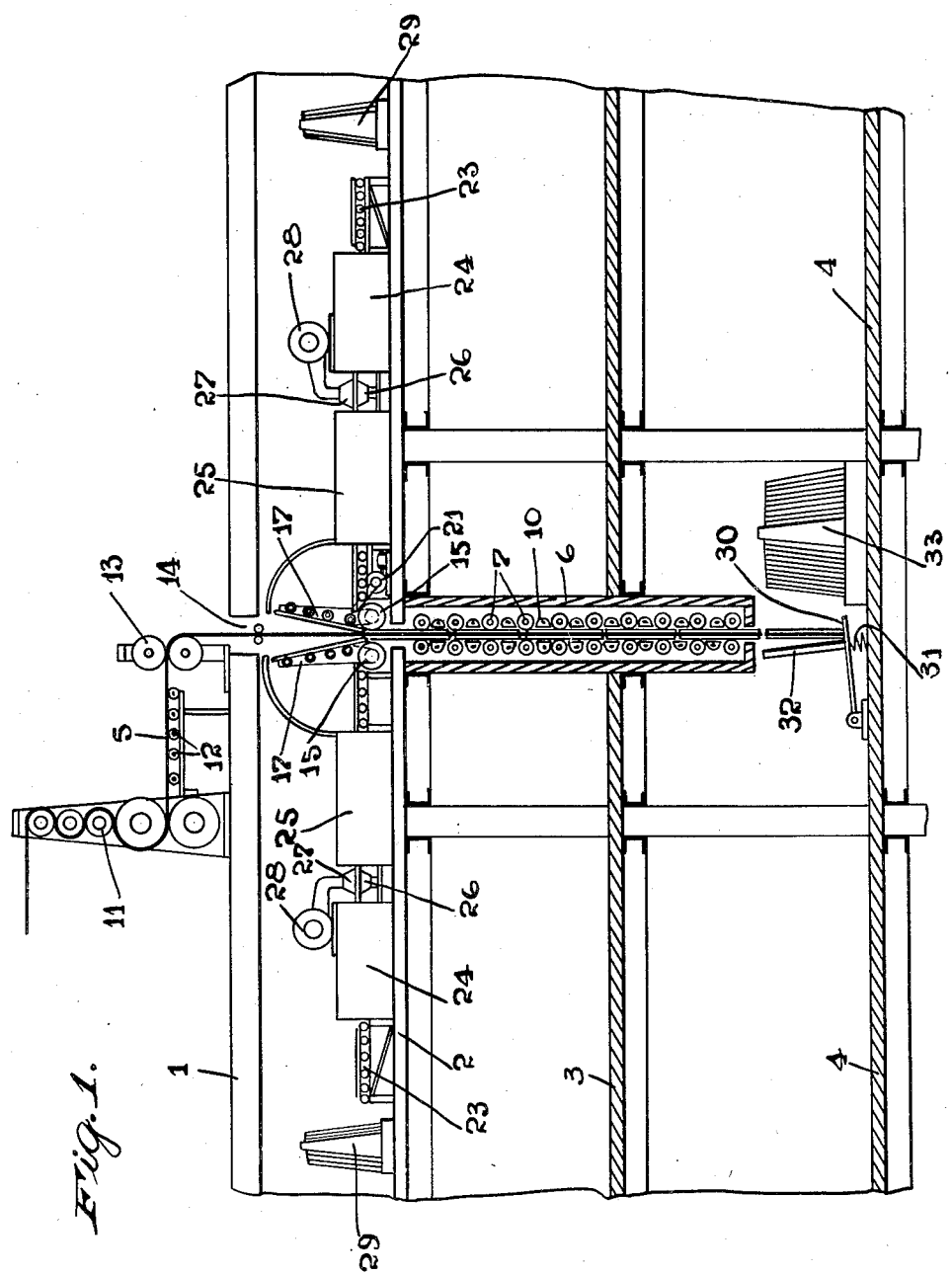
Figure 2:
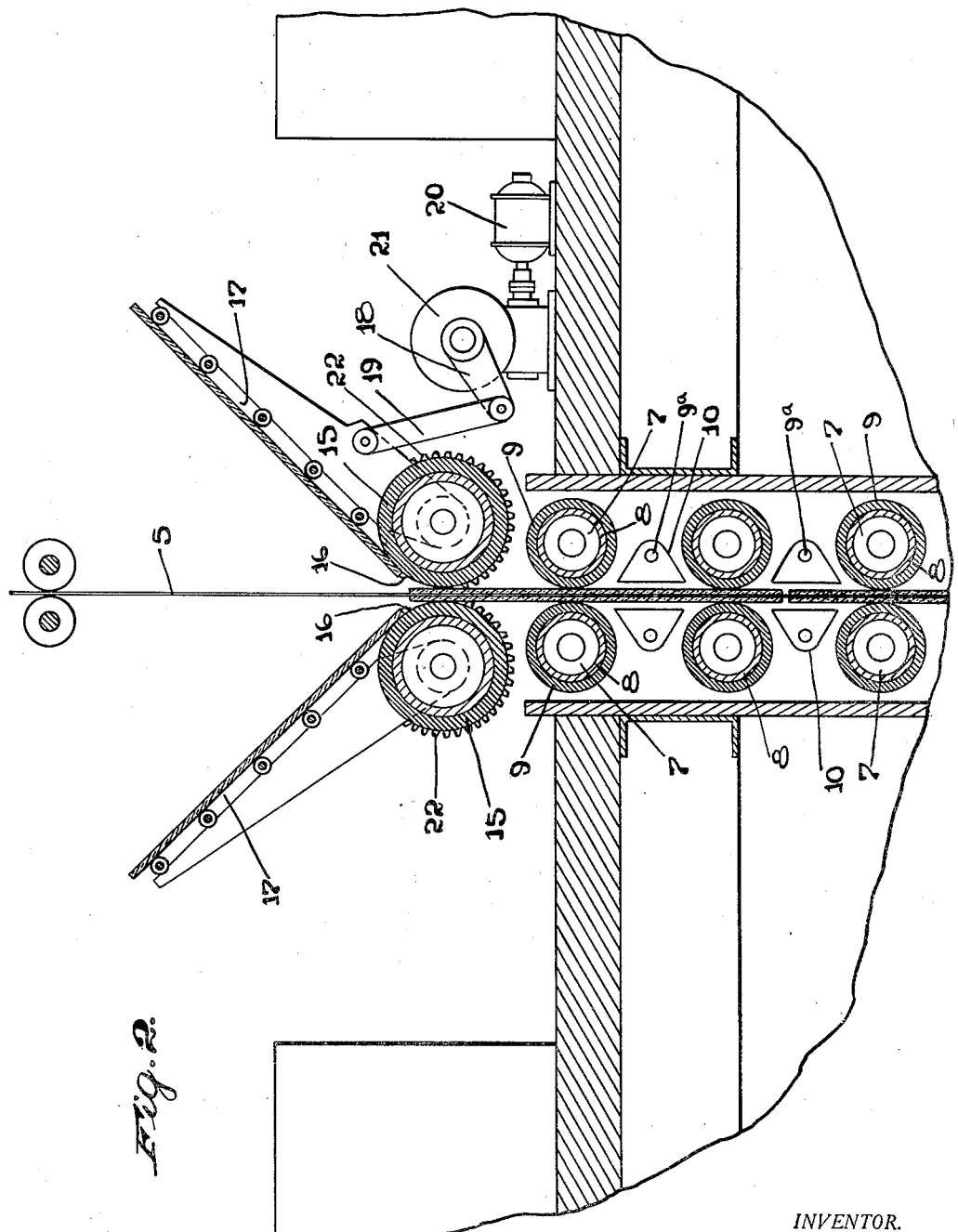

The invention relates to a process and apparatus for making safety glass continuously in a straight away operation. It is illustrated and described in the production of glass in which the interlayer is of synthetic resin, or the like, which may be secured to the glass by the application of heat and pressure without the use of cement, but it will be understood that interlayers which require cement may be utilized by coating the faces of the glass sheets with a cement, such as gelatine, which becomes active when the sandwich is exposed to heat and pressure. The invention has for its objects the provision of an improved apparatus and process which may be operated more rapidly and with less manual labor than the intermittent processes now universally employed, which requires a relatively limited factory space, and which may be used in connection with a continuously formed interlayer. One embodiment of the apparatus which may be used for carrying out the process is illustrated in the accompanying drawings, wherein:

Figure 1 is a vertical section through the complete apparatus. And Fig. 2 is a vertical section on an enlarged scale through a portion of the apparatus.

Referring to the drawings, 1, 2, 3, and 4 are work floors of a structure in which the apparatus is installed. In carrying out the operation, a sheet of reinforcing material 5, which is to constitute the interlayer in the laminated units, is carried continuously downward through a roller press, pairs of glass sheets being applied in series to the opposite sides of the interlayer preliminary to its passage through the press. A space is left between the successive pairs of sheets, as applied to the interlayer, and after each unit emerges from the bottom of the press, the interlayer is severed and the composite plate is placed upon a receiving rack.

The roller press is of a type well known in the art except that its position is vertical instead of horizontal. It comprises a casing 6 in which are mounted pairs of opposing presser rolls 7, 7. As indicated in Fig. 2, these rolls consist of pipe sections 8 each provided with a rubber cover 9. Intermediate the successive pairs of rolls are suitable heating means. As shown, these consist of resistance elements 9a in reflectors 10, current being supplied through the elements to provide the necessary heat. It will be understood that any other suitable form of heater may be employed and that the rolls are driven by means which are not shown. If a synthetic resin is used as an interlayer, no cement is necessary to attach the glass sheets to the interlayer, the heat and pressure serving to soften the resin and cause it to adhere to the glass sheets. Various kinds of resin may be employed as is well known in the art, the resin preferably used being a vinyl acetal. It is also possible to use one of the cellulose derivative plastics, such as cellulose nitrate, cellulose acetate or ethyl celluose, but in this case, some cement is necessary in order to secure attachment between the glass and the interlayer. This cement is applied to the faces of the glass sheets preliminary to their application to the interlayer, and the heat and pressure which is supplied in the passage of the sandwiches through the press serves to soften the cement so that adhesion is secured between the glass and interlayer.

The interlayer 5 is indicated in the present case as being formed continuously coincident with its application as an interlayer. The method of formation is immaterial in so far as the present invention is concerned. After formation, the sheet passes around the caldendering or curing rolls 11 which are suitably heated and then over the roller runway 12 and between a pair of rolls 13, after which it moves downward through the slot 14 and through the roller press. At the upper end of the roller press is a pair of assembling rolls 15 similar in construction to the rolls of the press, but of larger size and provided with stop members 16 in the form of ridges extending longitudinally of the rolls (Fig. 2) which serve to engage the lower edges of the glass sheets preliminary to their application to the interlayer and insure that the lower edges of such sheets shall be in alinement. The diameter of the rolls is equal to the width of the glass sheets plus the space which is to be provided between successive pairs of sheets. Mounted to swing about the axes of the rolls 15 are a pair of roller tables 17, 17 adapted to swing from a horizontal position to the upright position indicated in Fig. 1. The glass sheets are applied to these swinging tables when they are in horizontal position, and when they are swung to upright position, the lower edges of the sheets engage the stops 16. Upon a further rotation of the rolls, the glass sheets move downward therewith and are brought into engagement with the interlayer so that they are fed downward between the rolls 15 and then carried through the roller press as heretofore described.

The roller tables are oscillated from horizontal to vertical position by means of a crank 18 connected with the right hand table 17 by means of the link 19, the crank being driven from an electric motor 20 through the intermediary of suitable reduction gearing in the casing 21. The shafts of the two rolls 15, 15 carry intermeshing spur gears 22, 22 so that the table 17 to the left of the interlayer is moved with the other table by reason of the gear connection. The glass sheets are delivered to the table 17, 17 on roller runways 23, 23, which extend through washers 24, 24 and heaters 25, 25. Intermediate the washers and heaters are drying means consisting in each case of a suction nozzle 26 and a blower nozzle 27 operated from the power driven blowers 28. The glass sheets are supplied to the roller runways 23, 23 from the racks 29, 29 and carried through the washers and heaters where the sheets are cleaned and dried, and then run onto the swinging tables 17, 17. The operation is so timed that the glass sheets are supplied by the swinging tables to the forwardly moving interlayer at uniform intervals of about one inch. The sandwiches which are formed emerge from the bottom of the roller press casing and are received upon a yielding foot 30 pressed upward by a spring 31. A rack 32, which is slightly inclined and provided with rollers, avoids any danger of the plates tilting to the left after they are received upon the foot 30. As the sandwich emerges from the bottom end of the casing, the interlayer is separated by a workman stationed at this point, the cutting operation being preferably carried on by means of a knife. As each sandwich is separated, it is removed to the right and placed upon a rack 33. It will be understood that any suitable cutting means may be employed at the lower end of the casing, as a substitute for the hand operation as above described. Since the workman is required at this point to remove the completed plates, there is no great advantage in cutting off other than by a hand operation.

While the operation is preferably practiced, as shown, with a downward feed through the roller press and with gravity assisting the feed through the press, this movement might be reversed with the feed upward through the press and with an application of the glass sheets at the bottom end of the press casing. The interlayer may also be supplied from large rolls of the material instead of being supplied coincident with the production of the sheet as heretofore described.

What I claim is:

1. A process of making safety glass which consists in feeding an interlayer of non-shatter material continuously downward, applying pairs of sheets of glass in series to the opposite sides of the interlayer with cutting spaces between the successive pairs of sheets, subjecting each pair of sheets to heat and to a progressive roller pressing action as they move downward, and finally severing the interlayer at the spaces between the successive pairs of sheets.

2. Apparatus for making safety glass, a roller press comprising a series of presser rolls arranged in pairs one above the other to provide a vertical pass, means for feeding a continuous sheet of non-shatter material downwardly through the pass, means for applying to the opposite sides of the sheet before it reaches said pass a series of pairs of glass sheets, stop means at the upper end of the said pass for aligning the lower edges of each pair of glass sheets as they enter the pass, and means for applying heat to the series of pairs of sheets as they progress through the pass between the rolls.

3. Apparatus for making safety glass, a roller press comprising a series of presser rolls arranged in pairs one above the other to provide a vertical pass, means for feeding a continuous sheet of non-shatter material through the pass, a table on each side of the roller press at the inlet end thereof, each pivoted at its end next to the press and adapted to swing from a horizontal position to an upright position closely adjacent the line of travel of said interlayer so that the tables apply a series of pairs of glass sheets to said continuous sheet, and means for applying heat to the series of pairs of sheets as they progress through the pass between the rolls.

4. Apparatus for making safety glass, a roller press comprising a series of presser rolls arranged in pairs one above the other to provide a vertical pass, means for feeding a continuous sheet of non-shatter material through the pass, a table on each side of the roller press at the inlet end thereof, each pivoted at its end next the press and adapted to swing from a horizontal position to an upright position closely adjacent the line of travel of said continuous sheet, a horizontal runway in alinement with each of said tables when they are in horizontal position for delivering glass sheets thereto, means for oscillating the tables back and forth between their horizontal and vertical positions so as to apply the glass sheets carried thereby in pairs to said continuous sheet, and means for heating the pairs of sheets as they progress between the rolls of the press.

5. Apparatus for making safety glass, a roller press comprising a series of presser rolls arranged in pairs one above the other to provide a vertical pass, means for feeding a continuous sheet of non-shatter material downwardly through the pass, means for applying to the opposite sides of said sheet above the press a series of pairs of glass sheets, stop means carried by the upper pair of rolls for aligning the lower edges of each pair of sheets as they move into the pass, and means for applying heat to the series of pairs of sheets as they progress through the pass between the rolls.

WILLIAM OWEN.